US011904910B2

(12) United States Patent
Stoff

(10) Patent No.: US 11,904,910 B2
(45) Date of Patent: Feb. 20, 2024

(54) VARIABLE TRANSFORMER HOLDING DEVICE FOR E-LOCOS

(71) Applicant: Siemens Mobility GmbH, Munich (DE)

(72) Inventor: Helmut Stoff, Warngau (DE)

(73) Assignee: Siemens Mobility GmbH, Munich (DE)

( * ) Notice: Subject to any disclaimer, the term of this patent is extended or adjusted under 35 U.S.C. 154(b) by 735 days.

(21) Appl. No.: 17/055,655

(22) PCT Filed: Apr. 25, 2019

(86) PCT No.: PCT/EP2019/060663
§ 371 (c)(1),
(2) Date: Nov. 16, 2020

(87) PCT Pub. No.: WO2019/219344
PCT Pub. Date: Nov. 21, 2019

(65) Prior Publication Data
US 2021/0229710 A1 Jul. 29, 2021

(30) Foreign Application Priority Data
May 15, 2018 (DE) .......................... 102018207473.9

(51) Int. Cl.
*B61C 3/00* (2006.01)
*B61C 17/04* (2006.01)
*B61F 1/00* (2006.01)

(52) U.S. Cl.
CPC ................ *B61C 3/00* (2013.01); *B61C 17/04* (2013.01); *B60L 2200/26* (2013.01); *B61F 1/00* (2013.01)

(58) Field of Classification Search
CPC .......... B61C 3/00; B61C 17/04; B61C 17/00; B60L 2200/26
See application file for complete search history.

(56) References Cited

U.S. PATENT DOCUMENTS

| 10,611,385 | B2 | 4/2020 | Forrer |
| 10,787,182 | B2 | 9/2020 | Takabayashi |
| 2016/0009298 | A1 | 1/2016 | Kaiser |

FOREIGN PATENT DOCUMENTS

| CH | 153363 A | 3/1932 | |
| CN | 201980232 U | 9/2011 | |
| CN | 104527691 A * | 4/2015 | ................ B61F 1/08 |
| CN | 106080623 A | 11/2016 | |
| CN | 107757636 A * | 3/2018 | ............. B61C 17/00 |
| CN | 107757636 A | 3/2018 | |
| DE | 29620865 U1 | 4/1997 | |
| DE | 102013202236 A1 | 8/2014 | |

(Continued)

*Primary Examiner* — Scott A Browne
(74) *Attorney, Agent, or Firm* — Laurence A. Greenberg; Werner H. Stemer; Ralph E. Locher

(57) ABSTRACT

A transformer holding device for an electric locomotive having a transformer, includes at least one transformer support which is configured in such a way that the transformer can be displaced on an underframe of the electric locomotive during a maintenance operation so that the electric locomotive attains a predetermined center of gravity position. The transformer is fixed to the underframe of the electric locomotive during operation. A transformer arrangement for an electric locomotive and an electric locomotive are also provided.

3 Claims, 6 Drawing Sheets

(56) References Cited

FOREIGN PATENT DOCUMENTS

| | | |
|---|---|---|
| DE | 102013110637 A1 | 3/2015 |
| DE | 102014113829 A1 | 3/2016 |
| FR | 3056651 A1 | 3/2018 |
| JP | 2007131128 A | 5/2007 |
| JP | 2007182208 A | 7/2007 |
| JP | 2013151210 A | 8/2013 |
| WO | WO 2012116971 A1 | 9/2012 |
| WO | WO 2016139167 A1 | 9/2016 |
| WO | WO 2017163392 A1 | 9/2017 |

* cited by examiner

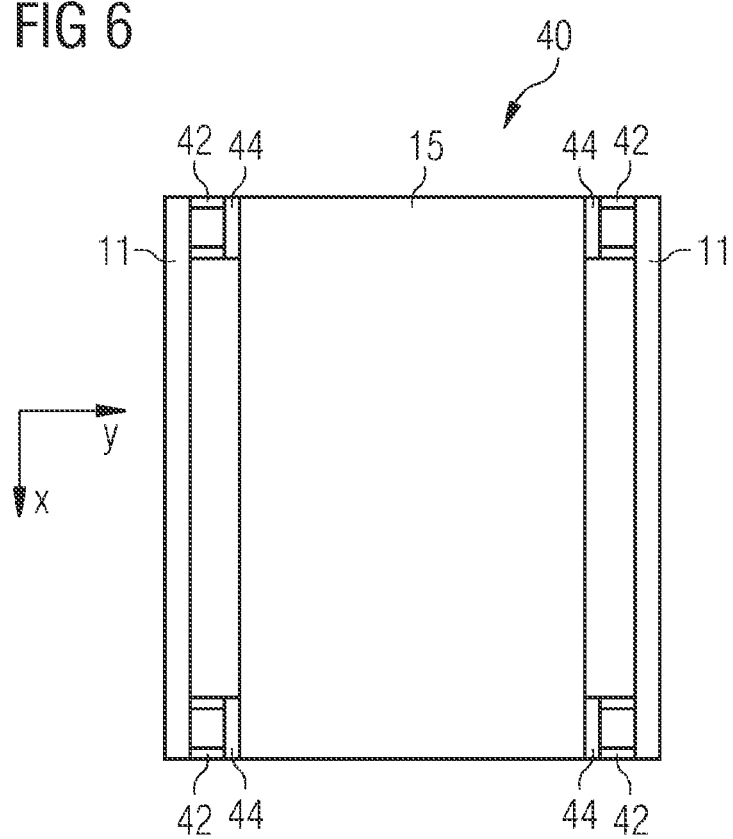

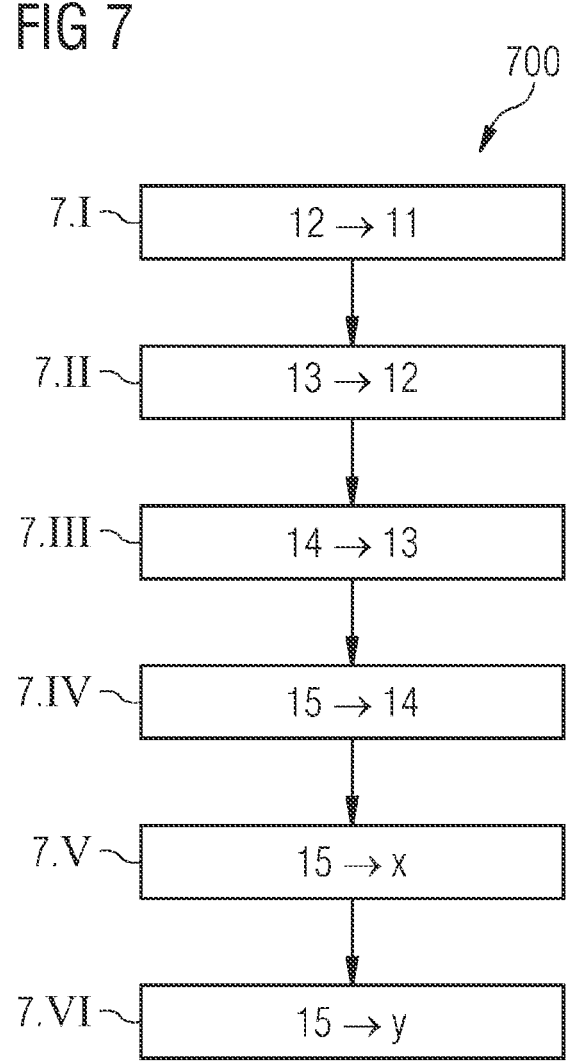

VARIABLE TRANSFORMER HOLDING DEVICE FOR E-LOCOS

BACKGROUND OF THE INVENTION

Field of the Invention

The invention relates to a transformer holding device. Moreover, the invention relates to a transformer arrangement. In addition, the invention relates to a electric locomotive. Furthermore, the invention relates to a method for positioning a transformer in an electric locomotive.

Electric locomotives and diesel locomotives have to be very precisely balanced out in terms of their weight distribution in order to avoid relatively large axial load differences and wheel load differences. In order to achieve this, the design and the distribution of the components of the locomotives are conventionally already chosen during construction such that an as central as possible center of gravity results.

After the assembly of the locomotive, excessive center of gravity deviations in the longitudinal direction, that is to say in the x direction, or transversely thereto in the y direction can then be compensated for only by means of adding additional ballast weights, with the result that there is possibly caused an inadmissible increase in the overall weight of the locomotive. In order to prevent this, lightweight construction measures can be applied at certain points, although this entails an increase in the construction costs.

In locomotives, the transformer, with a weight of approximately 15% of the locomotive mass, constitutes the largest locally installed individual mass of the locomotive. In modern electric locomotives, the transformer is fastened in the underframe between the bogies. The installation position is conventionally chosen to be fixed and, once set, can as a rule also no longer be changed in order to compensate for imbalances.

Documents CN 106 080 623 A and JP 2007 182 208 A disclose further solutions for fastening a transformer to a rail vehicle.

SUMMARY OF THE INVENTION

It is therefore the object to specify a device whereby a simplified adaptation of the weight distribution in an electric locomotive is made possible.

This object is achieved by a transformer holding device for an electric locomotive having a transformer, comprising at least one transformer support which is configured to the effect that the transformer can be displaced on an underframe of the electric locomotive in a maintenance operation in order to achieve a predetermined center of gravity position of the electric locomotive, and the transformer is fixed to the underframe of the electric locomotive during operation, in which the at least one transformer support includes at least one holder which is fastened to a locomotive longitudinal member or a locomotive crossmember of the electric locomotive, a transformer claw which is disposed between the transformer and the holder and can be displaced relative to the holder in the longitudinal direction and in the transverse direction during a maintenance operation, and including an intermediate element which is disposed between the holder and the transformer claw and is configured in such a way that the transformer claw can be displaced relative to the holder in the longitudinal direction and in the transverse direction in a maintenance operation, in which the intermediate element includes a clampable dovetail fixing, in which the clampable dovetail fixing includes at least two dovetail elements which are displaceable in different directions with respect to one another. This object is also achieved by a transformer arrangement and an electric locomotive.

The transformer holding device according to the invention for an electric locomotive having a transformer comprises at least one transformer support. The transformer support is itself arranged on an underframe of the electric locomotive and holds the transformer at a position in the electric locomotive. The transformer support is designed to the effect that the transformer of the electric locomotive can be displaced in a maintenance operation relative to the underframe in order to achieve a predetermined center of gravity position of the electric locomotive. In order to produce the displaceability, at least one part-element of the transformer support is displaceable in a first state. Here, the displacement of the at least one part-element preferably occurs relative to the underframe of the electric locomotive. Here, the displacement of the part-element can occur relative to nondisplaceable part-elements of the transformer support. Furthermore, the transformer support is designed in such a way that the transformer is fixed to the underframe of the electric locomotive during operation. In order to produce the fixing, the at least one displaceable part-element is designed such that it can be transferred into a fixed state.

An ideal center of gravity position of the electric locomotive can advantageously be subsequently set and changed without additional masses. Moreover, it is possible by means of the transformer holding device according to the invention for weight to be saved since additional ballast weights are not required for center of gravity correction or at least can be reduced. Furthermore, it is possible to avoid complicated measures for the lightweight construction of locomotives which customarily involve balancing with ballast weights. By virtue of the displaceability of the transformer that is possible even after completion of a locomotive, the center of gravity can be corrected at a subsequent point in time without having to modify structures of the locomotive, for example as a result of lightweight construction. In this way, the project for the completion of the locomotive becomes more reliable in terms of planning. Moreover, the availability of a large number of equipment variants is facilitated since a center of gravity displacement due to a modified equipment can be compensated for in a simple manner without additional design measures by means of displacing the transformer.

The transformer arrangement according to the invention for an electric locomotive comprises a transformer. Furthermore, the transformer arrangement according to the invention also comprises a transformer holding device for displaceably fixing the transformer to an underframe of the electric locomotive. The transformer arrangement according to the invention shares the advantages of the transformer holding device according to the invention.

The electric locomotive according to the invention comprises the transformer arrangement according to the invention. The electric locomotive according to the invention shares the advantages of the transformer arrangement according to the invention.

In the method according to the invention for mounting a transformer in an electric locomotive, at least one transformer support is mounted on an underframe of the electric locomotive. Here, the transformer is arranged so as to be displaceable on the transformer support. Finally, a displacement of the transformer occurs in the longitudinal direction and/or in the transverse direction in such a way that a predetermined center of gravity position of the electric locomotive is achieved. The transformer is subsequently fixed to the transformer support. A center of gravity position of an electric locomotive can advantageously be corrected at any time during maintenance on the locomotive without having to use additional masses. A weight saving is achieved in this way. As a result, the energy consumption is reduced.

The dependent claims and the description which follows respectively contain particularly advantageous embodiments and developments of the invention. In particular the claims of one category of claims may also be developed analogously to the dependent claims of another category of claims and the relevant parts of the description. Moreover, the various features of different exemplary embodiments and claims may also be combined within the scope of the invention to form new exemplary embodiments.

In a preferred embodiment of the transformer holding device according to the invention, the at least one transformer support is designed to the effect that the transformer is displaceable in the longitudinal direction. In this way, differences between axle loads of different axles can be reduced.

Alternatively or additionally, the at least one transformer support can be designed to the effect that the transformer is displaceable in the transverse direction. An uneven loading of wheels arranged at the same longitudinal position can advantageously be avoided.

In a variant of the transformer holding device according to the invention, the at least one transformer support comprises at least one holder, which is fastened to a locomotive longitudinal member or a locomotive cross member of the electric locomotive, and at least one transformer claw which is arranged between the transformer and the at least one holder and is displaceable relative to the holder in the longitudinal direction and/or in the transverse direction during a maintenance operation. A connection between the holder and the transformer claw can advantageously be configured to be displaceable and thus allow a simple center of gravity displacement.

In one embodiment of the transformer holding device according to the invention, the latter comprises an intermediate element which is arranged between the holder and the transformer claw and is designed in such a way that the transformer claw is displaceable relative to the holder in the longitudinal direction and/or in the transverse direction during a maintenance operation. A displacement of the center of gravity of the electric locomotive can advantageously be brought about by a displacement of the intermediate elements.

The intermediate element can be designed for example as a specifically adaptable intermediate plate which has a surface region in which a bore for receiving a fixing screw can be differently positioned. The position of the bore can advantageously be chosen in such a way that the center of gravity of the transformer is displaced in such a way that the locomotive has a desired center of gravity.

In one specific variant of the transformer holding device according to the invention, the intermediate element comprises an intermediate plate which is displaceable in the longitudinal direction and/or in the transverse direction during a maintenance operation. This advantageously allows a displacement of the transformer to be carried out in the direction of the main axes of the electric locomotive.

The intermediate element can alternatively comprise a clampable dovetail fixing. Here, the clampable dovetail fixing can comprise at least two dovetail elements which are displaceable in different directions with respect to one another. These dovetail elements allow a displacement of the transformer in the longitudinal direction and in the transverse direction. It is possible at the same time for a position of the transformer to be fixed by means of the clamping function of the dovetail elements. With particular preference, the two dovetail elements are oriented at right angles to one another. Here, one of the two dovetail elements is oriented in the longitudinal direction of the electric locomotive, and the other dovetail element is oriented in the transverse direction of the electric locomotive. In this case, a particularly simple center of gravity variation can be carried out along the main axes of the electric locomotive. In this case, moreover, an arrangement of the dovetail elements can occur parallel to the longitudinal member or perpendicular thereto, which is particularly simple to realize.

The invention will be explained in even greater detail below with reference to the appended figures on the basis of exemplary embodiments.

BRIEF DESCRIPTION OF THE SEVERAL VIEWS OF THE DRAWING

FIG. 6 shows a schematic plan view of the transformer holding device illustrated in FIG. 4 and FIG. 5, FIG. 7 shows a flow diagram which illustrates a method for positioning a transformer in an electric locomotive according to one exemplary embodiment of the invention.

DETAILED DESCRIPTION OF THE INVENTION

Figure 1:
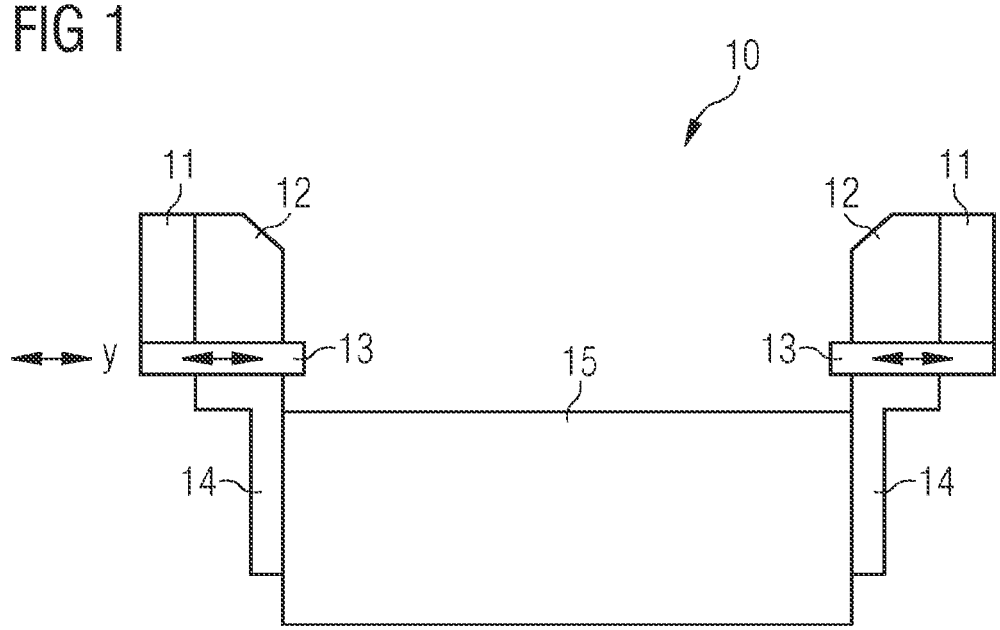
FIG. 1 shows a schematic cross-sectional illustration of a transformer holding device according to one exemplary embodiment of the invention.

FIG. 1 illustrates a cross-sectional view of a transformer holding device 10 according to a first exemplary embodiment of the invention. The transformer holding device 10 is part of an electric locomotive (not shown) and is designed to hold a transformer 15 of the electric locomotive in position. The transformer holding device 10 comprises two loco longitudinal members 11 which are part of an underframe of the electric locomotive. The loco longitudinal members 11 can be respectively seen in FIG. 1 at the right and left edge of the image and form the suspension for the remaining elements of the transformer holding device 10. In each case two holders 12 are laterally welded to the two loco longitudinal members 11. Overall, four holders 12 are thus fixedly arranged on the two loco longitudinal members 11, of which only two loco longitudinal members 11 can be seen in FIG. 1.

In each case an intermediate plate 13 is screwed to the underside of the holders 12. The screw connections between the holders 12 and the intermediate plate 13 are such that the intermediate plates are displaceable in the x direction, that is to say in the longitudinal direction, and in the y direction, that is to say in the transverse direction, if the screws are loosened. to the undersides of the intermediate plates 13 there is in each case securely screwed a transformer claw 14 having a right-angled shape. The transformer claws 14 each have a short leg and a long leg. The short leg is in each case screwed to the underside of the intermediate plate 13, and the longer leg is fixed to the narrow side of the transformer 15. Since the intermediate plates 13 are displaceable in the x direction and in the y direction, the transformer 15 can be displaced during a maintenance operation in order to set a predetermined center of gravity position of the electric locomotive. Alternatively, it is also possible in a simple manner to make a bore in the intermediate plate 13 at a desired position, and the transformer claws 14 can be displaced in the x direction and in the y direction corresponding to the position of the new bore without the intermediate plate being displaced. During operation, the transformer 15 is securely fixed to the underframe 11 of the electric locomotive, with, in this state, the intermediate plates being securely screwed to the holders 12 and to the transformer claws 14.

Figure 2:
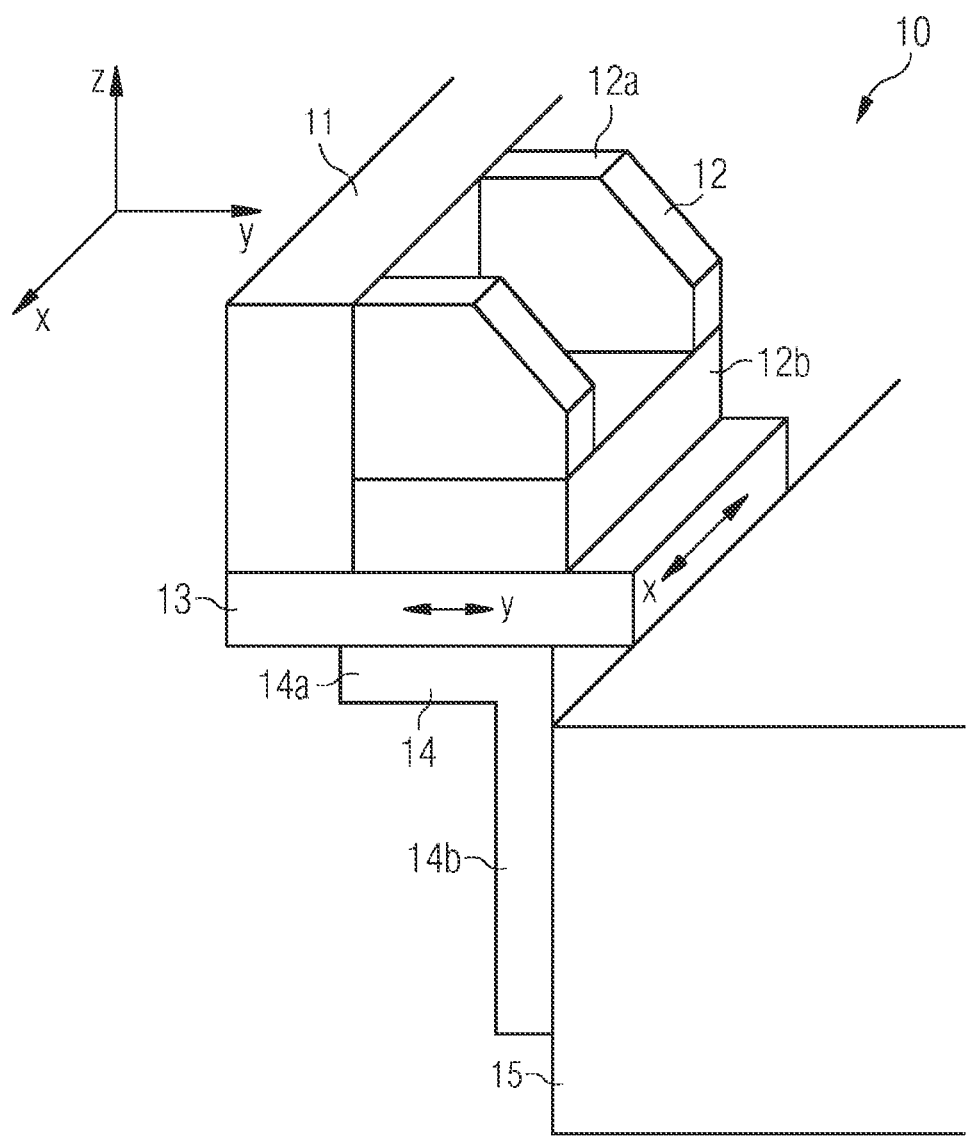
FIG. 2 shows a schematic perspective illustration of the transformer holding device shown in FIG. 1.

FIG. 2 illustrates in perspective part of the transformer holding device 10 shown in FIG. 1. As can be seen in FIG. 2, the holders 12 mounted on the loco longitudinal members 11 each have two legs 12a which run in the y-z plane and which are securely welded to the respective loco longitudinal member 11. Part of the holders 12 is also in each case a flat, cuboidal region 12b which runs in the x-y plane and which is securely welded by its long narrow side to the respective loco longitudinal member 11 and whose wide underside is in each case screwed to an intermediate plate 13 already shown in FIG. 1 (only one intermediate plate is illustrated in FIG. 2). As can be seen in FIG. 2, the intermediate plate 13 can be displaced in the x direction and in the y direction if the screws are loosened. Such a displacement operation can be used to set a predetermined center of gravity position in the E-locomotive. In each case a transformer claw 14 is mounted by its short leg 14a on the underside of the intermediate plates 13. The transformer claw is fixed by its long leg 14b to the transformer 15.

Figure 3:
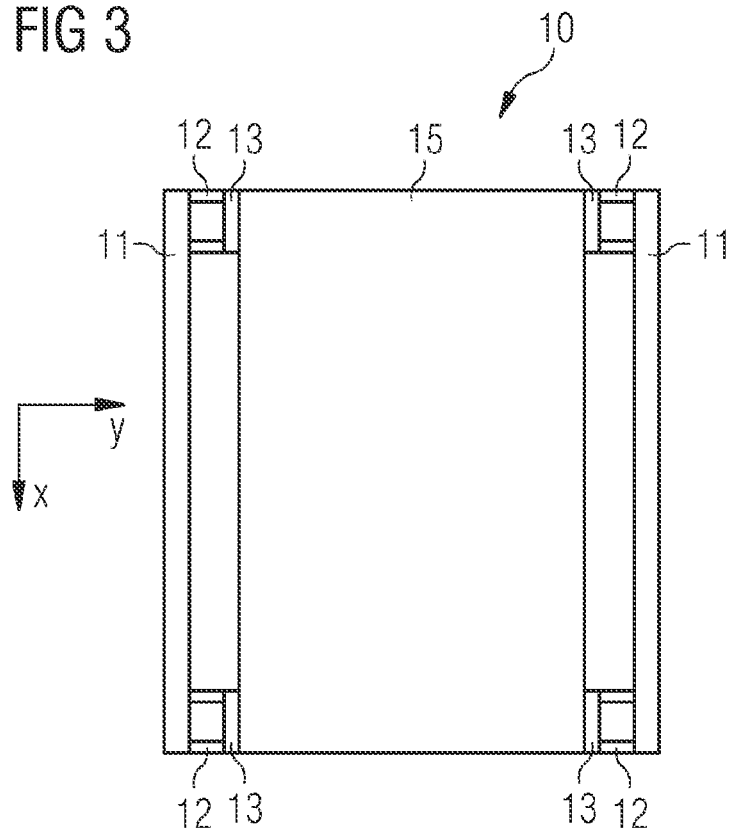
FIG. 3 shows a schematic plan view of the transformer holding device illustrated in FIG. 1 and FIG. 2.

FIG. 3 shows a plan view of the transformer holding device 10 illustrated in FIG. 1 and FIG. 2. As can be seen in FIG. 3, the transformer holding device 10 comprises two loco longitudinal members 11 to each of which there are welded two holders 12. The holders 12 are in turn screwed to the already-mentioned intermediate plates 13 (overall there are four intermediate plates), which are each connected to a transformer claw 14 (not shown in FIG. 3). As already mentioned, the transformer 15 of the E-locomotive is fixed between the transformer claws 14.

Figure 4:
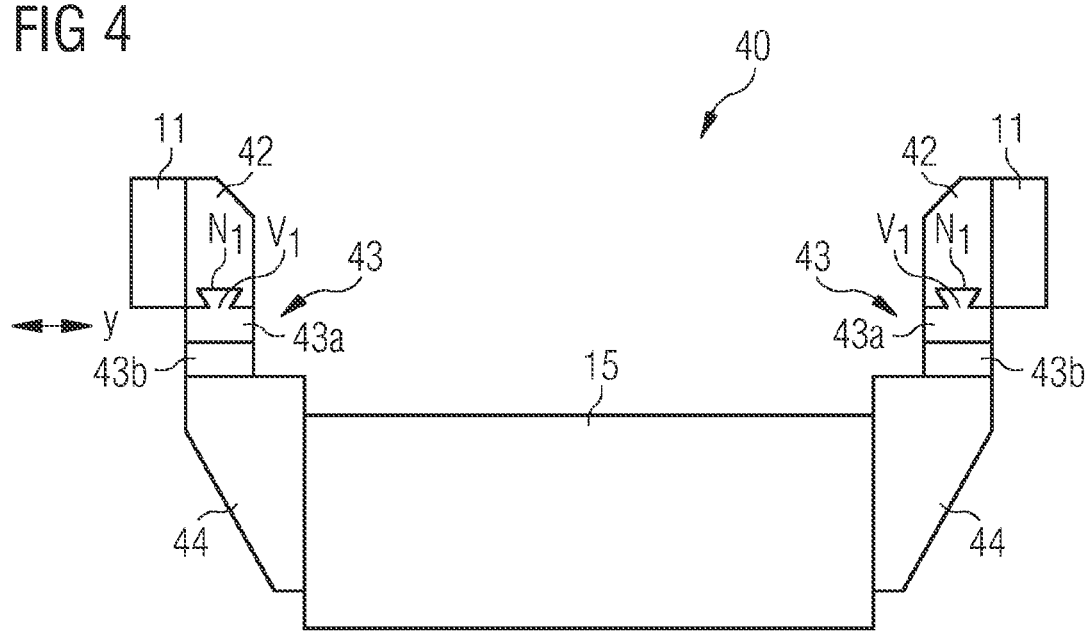
FIG. 4 shows a schematic cross-sectional illustration of a transformer holding device according to a second exemplary embodiment of the invention.

FIG. 4 illustrates a schematic cross-sectional illustration of a transformer holding device 40 of an E-locomotive according to a second exemplary embodiment of the invention. Just like the transformer holding device 10 shown in FIG. 1, the transformer holding device 40 comprises two loco longitudinal members 11 which are part of an underframe of the electric locomotive. The loco longitudinal members 11 can be respectively seen in FIG. 4 at the right and left edge of the image and form the suspension for the remaining elements of the transformer holding device 40.

In each case two holders 42 are laterally welded to the two loco longitudinal members 11. Overall, four holders 42 are thus fixedly arranged on the loco longitudinal members 11, of which only two loco longitudinal members 11 can be seen in FIG. 4. However, the holders 42 are designed to be different on their underside by comparison with the holders 12 shown in FIG. 1. As can be seen in FIG. 4, the holders 42 have a groove-like cutout $N_1$ running in the longitudinal direction or in the x direction. A first dovetail part-element 43a of a dovetail guide 43 engages by a projection $V_1$ in this groove-like cutout $N_1$. The first dovetail part-element 43a is displaceable in the x direction (see also FIG. 5) and, after a displacement, is securely clamped at a predetermined position on the holder 42 by frictional locking and force locking. A second dovetail part-element 43b is securely clamped on the underside of the first dovetail part-element 43a and can be displaced in the y direction (see FIG. 5).

For this purpose, there is in turn formed, on the underside of the first dovetail part-element 43a, a groove-like cutout $N_2$ (see FIG. 5) which this time, however, runs in the y direction or in the transverse direction and in which a corresponding projection $V_2$ (see FIG. 5) engages. The second dovetail part-element 43b can be displaced in the y direction relative to the first dovetail part-element 43a. In each case a transformer claw 44 is securely fixed by its narrow side to the respective underside of the second dovetail part-element 43b. To the transformer claws 44 in turn is securely fixed the transformer 15 of the E-locomotive. In the application, the upper side is intended to be understood as meaning a side or surface oriented upwardly in the positive z direction. The underside is intended to be understood as meaning a side or surface oriented in the opposite direction thereto.

Figure 5:
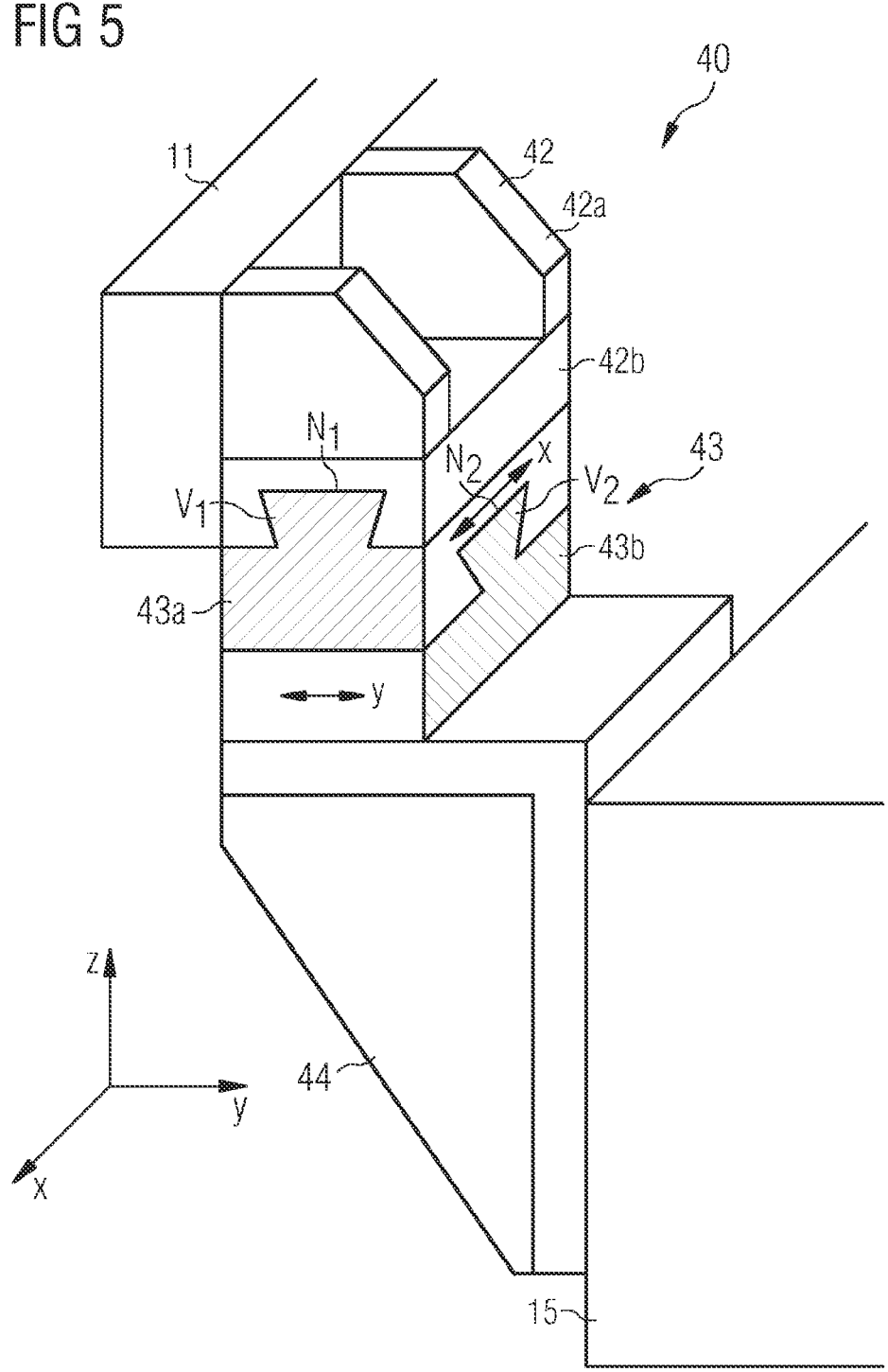
FIG. 5 shows a schematic perspective illustration of the transformer holding device shown in FIG. 4.

FIG. 5 illustrates in perspective part of the transformer holding device 40 shown in FIG. 4. As can be seen in FIG. 5, the holders 42 mounted on the loco longitudinal member 11 each have two legs 42a which run in the y-z plane and which are securely welded to the respective loco longitudinal member 11. Part of the holders 42 is also in each case a flat, cuboidal region 42b which runs in the x-y plane and which is securely welded by its long narrow side to the respective loco longitudinal member 11 and whose wide underside is in each case connected by way of a tongue and groove connection to a first dovetail part-element 43a already shown in FIG. 5.

Here, as already mentioned in conjunction with FIG. 4, the cuboidal region 42b has a groove-like cutout $N_1$ which runs in the longitudinal direction of the E-locomotive, that is to say in the x direction. In the groove-like cutout $N_1$, as already mentioned in conjunction with FIG. 4, there engages a dovetail-shaped projection $V_1$ of the first dovetail part-element 43a (marked by hatching in FIG. 5), which forms a clamping connection with the latter. As already mentioned, the first dovetail part-element 43a can be displaced relative to the holder 42 in the x direction. In order to allow a displacement of the transformer 15 in the y direction as well, a second dovetail part-element 43b is arranged on the underside of the first dovetail part-element 43a and, as already likewise indicated, is connected to the first dovetail part-element by way of a dovetail-shaped tongue and groove connection so as to be displaceable in the y direction. For this purpose, the first dovetail part-element 43a has on its underside a groove $N_2$ which runs in the y direction, that is to say in the transverse direction, and in which there engages a dovetail-shaped projection $V_2$ (marked by hatching) formed by the second dovetail part-element 43b. As already mentioned, in each case a transformer claw 44 is securely fixed by its narrow side to the underside of the second dovetail-shaped part-element 43b. To the transformer claws 44 in turn there is securely fixed the transformer 15 of the E-locomotive.

FIG. 6 illustrates a plan view of the transformer holding device 40 shown in FIG. 4 and FIG. 5. The plan view shown in FIG. 6 resembles the plan view in FIG. 3. Thus, similarly to the plan view shown in FIG. 3, there can be seen two loco longitudinal members 11 to each of which two holders 42 are welded. However, in the second exemplary embodiment, the holders 42 are connected to the dovetail guide 43 described in conjunction with FIG. 4 and FIG. 5. However, in the plan view shown in FIG. 6, the dovetail elements 43 are not visible since they are situated below the holders 42. For that reason, by contrast with FIG. 3, there can be seen in FIG. 6 the transformer claws 44 which, as viewed from above, are situated between the holders 42 and the transformer 15 of the electric locomotive.

FIG. 7 shows a flow diagram 700 which illustrates a method for mounting a transformer in an electric locomotive according to one exemplary embodiment of the invention.

First of all, in step 7.I, four holders 12 are securely welded to the two loco longitudinal members 11. Then, in step 7.II, an intermediate plate 13 is securely screwed to a respective holder 12 in a predetermined x-y position. In step 7.III, in each case a transformer claw 14 is fixed by its short leg to the underside of the intermediate plate 13. Furthermore, in step 7.IV, the transformer 15 is fastened by its two long narrow sides between the long legs of the transformer claw 14. Finally, there also occurs the actual adjusting operation in which, in step 7.V, first of all the intermediate plate 13 is displaced in the x direction after loosening the fastening screws until the x component of the center of gravity of the E-locomotive is exactly in the center. Furthermore, in step 7.VI, the intermediate plate is also displaced in the y direction in order to displace the y component of the center of gravity of the E-locomotive to a predetermined position. Alternatively, it is also possible in a simple manner to make a bore in the intermediate plate 13 at a desired position and to displace the transformer claw 14 in the x direction and in the y direction corresponding to the position of the new bore without displacing the intermediate plate. Finally, the screws of the intermediate plate 13 are tightened and thus the transformer is fixed in the adjusted position.

It should finally be pointed out again that the above-described methods and devices are merely preferred exemplary embodiments of the invention and that the invention can be varied by a person skilled in the art without departing from the scope of the invention, to the extent prescribed by the claims. For the sake of completeness, it should also be pointed out that the use of the indefinite article "a", "an" or "one" does not exclude the possibility of the features in question also being multiply present. Similarly, the term "unit" does not exclude the possibility that it consists of multiple components, which may possibly also be spatially distributed.

The invention claimed is:

1. A transformer holding device for an electric locomotive, the locomotive having a cross member, an underframe having a longitudinal member, and a transformer fixed to the underframe during operation, the transformer holding device comprising:
    at least one transformer support configured to displace the transformer on the underframe during a maintenance operation to achieve a predetermined center of gravity position of the electric locomotive;
    said at least one transformer support including:
        at least one holder fastened to the locomotive longitudinal member or the locomotive crossmember, and
        a transformer claw disposed between the transformer and said at least one holder, said transformer claw displaceable relative to said at least one holder in a longitudinal direction and in a transverse direction during the maintenance operation; and
    an intermediate element disposed between said at least one holder and said transformer claw, said intermediate element configured to permit said transformer claw to be displaced relative to said at least one holder in the longitudinal and transverse directions during the maintenance operation;
    said intermediate element including a clampable dovetail fixing having at least two dovetail elements displaceable in different directions relative to one another.

2. A transformer arrangement for an electric locomotive, the transformer arrangement comprising:
    a transformer; and
    a transformer holding device according to claim 1 for displaceably fixing the transformer to the underframe of the electric locomotive.

3. An electric locomotive, comprising a transformer arrangement according to claim 2.

\* \* \* \* \*